United States Patent [19]
Takashima

[11] Patent Number: 5,148,296
[45] Date of Patent: Sep. 15, 1992

[54] ORIGINAL DOCUMENT READING APPARATUS

[75] Inventor: Izumi Takashima, Kanagawa, Japan

[73] Assignee: Fuji Xerox Co., Ltd., Tokyo, Japan

[21] Appl. No.: 634,808

[22] Filed: Dec. 31, 1990

Related U.S. Application Data

[63] Continuation of Ser. No. 289,139, Dec. 23, 1988, abandoned.

[30] Foreign Application Priority Data

Dec. 25, 1987 [JP] Japan ............................. 62-333520

[51] Int. Cl.$^5$ .............................................. H04N 1/04
[52] U.S. Cl. ...................................... 358/482; 358/444
[58] Field of Search ................. 358/280, 293, 213.11, 358/482, 483, 213.29, 213.26, 213.15, 213.17, 444

[56] References Cited

U.S. PATENT DOCUMENTS

| | | | |
|---|---|---|---|
| 4,471,375 | 9/1984 | Oritsuki | 358/280 |
| 4,661,713 | 4/1987 | Besson et al. | 358/213.17 |
| 4,734,760 | 3/1988 | Futaki | 358/280 |
| 4,734,787 | 3/1988 | Hayashi | 358/280 |
| 4,742,240 | 5/1988 | Yamanishi | 358/293 |
| 4,878,102 | 10/1989 | Bakker et al. | 358/213.26 |
| 4,884,143 | 11/1989 | Uya | 358/213.29 |

FOREIGN PATENT DOCUMENTS

| | | |
|---|---|---|
| 0083976 | 7/1983 | European Pat. Off. |
| 0223260 | 5/1987 | European Pat. Off. |
| 60-16760 | 1/1985 | Japan |
| 60-31357 | 2/1985 | Japan |
| 60-31358 | 2/1985 | Japan |
| 60-134166 | 7/1985 | Japan |
| 60-134167 | 7/1985 | Japan |
| 60-134168 | 7/1985 | Japan |
| 61-269462 | 11/1986 | Japan |
| 1601146 | 10/1981 | United Kingdom |
| 2157114A | 10/1985 | United Kingdom |
| 2175170A | 11/1986 | United Kingdom |

Primary Examiner—Edward L. Coles, Sr.
Assistant Examiner—Jerome Grant, II
Attorney, Agent, or Firm—Finnegan, Henderson, Farabow, Garrett and Dunner

[57] ABSTRACT

An original document recording apparatus having a plurality of line sensors arranged in a uniformly staggered pattern. Each line sensor has a built-in analog memory, which stores the image and outputs the image according to a delay value. The built-in analog memory is controlled by two kinds of pulse-train signals generated by a control means, thus reducing a vertical delay time.

3 Claims, 8 Drawing Sheets

ORIGINAL DOCUMENT READING APPARATUS

This application is a continuation of application Ser. No. 07/289,139, filed Dec. 23, 1988, now abandoned.

BACKGROUND OF THE INVENTION

The present invention relates to an image reading apparatus using sensors closely arranged in a uniformly staggered array, and more particularly relates to a technique for improving the reading speed of such an apparatus.

Currently, for photoelectrically reading the density of an image on an original document, there exists a fine sensor in which a plurality of light receiving elements composed of, for example, amorphous silicon are aligned on a line in the transverse direction of the original document to be read. When, for example, a document of A4 size (Japanese standard) is read in its transverse direction (about 300 mm) with a resolution of 16 dots (picture elements) per mm, it is necessary to provide a line sensor having approximately 4,800 image sensing elements on a substrate of approximately 300 mm. However, it is difficult to provide so many light receiving elements on one substrate substantially uniformly and without omission. Therefore, such an arrangement is impractical from the viewpoint of cost unless yield or the like is improved.

This problem is partially solved by placing a plurality of line sensors, each having approximately 1,000 light receiving elements, on one substrate.

A line sensor, however, has invalid bits at its opposite ends, which are incapable of reading an image. Accordingly, unreadable regions are formed when a plurality of line sensors are arranged side by side in a line. This problem is partially solved by arranging a plurality of line sensors in a uniformly staggered array so that adjacent line sensors read different lines respectively.

When a plurality of line sensors are arranged in a uniformly staggered array, adjacent line sensors scan and read different surface portions of an original document. That is, if an original document and line sensors are moved in the direction perpendicular to the scanning direction of the line sensors so as to read the surface of the original document, a time lag corresponding to the positional discrepancy between line sensors adjacent to each other is produced between signals from the first row of line sensors for precedingly scanning the original document and the second row of line sensors for succeedingly scanning the same original document. For example, in a copying machine in which a high resolution of 16 picture elements per mm is required, the time lag undesirably affects the accuracy of reading. Moreover, in reading a color image, the time lag also affects color balance.

Therefore, in order to obtain a continuous signal of one line from image signals divisionally read by means of a plurality of line sensors, at least a signal output from the first row of line sensors for precedingly scanning an original document is stored and then the stored signal is read out in synchronism with an output signal succeedingly produced from the second row of line sensors. For example, assume that the quantity of the positional discrepancy is 250 μm, the resolution is 16 dot/mm, and a delay of four lines is required.

The above example might use one of two systems: 1) a system in which a signal read out from the first row sensors is stored in digital form after analog-to-digital conversion and 2) a system in which a signal read out from the first row by sensors is stored in analog form before analog-to-digital conversion. Various proposals have been made in which a digital memory for correction is provided external to the sensors, and an analog memory is provided as an output delay means to delay the output data of the sensors to thereby correct the time lag (for example, Japanese unexamined Patent Publication No. 60-16760, 60-31357, 60-31358, 60-134167, 60-134168, and 61-269462).

The former system, in which the signal to be processed is a digital signal, is advantageous because the signal processing is easy and is hardly affected from the outside. However, a large memory is required to store a digital signal. For example, assuming that a digital signal has 8 bits, a line sensor has 1,000 light receiving elements, and a positional discrepancy between line sensors adjacent to each other is equal to four lines, a memory having a storage capacity of at least 8 (bits)×1,000 (elements)×4 (lines)=32,000 (bits) is required. In order to eliminate the need for large amounts of storage, therefore, the latter system, in which an analog signal is stored before it is converted into a digital signal, is preferable.

A line sensor shown in FIG. 7 comprises a vertical shift register including a built-in analog memory. The quantity of delay for one of 1 to 7 lines of the line sensor can be selected by changing the access conditions of seven stages of line shift gates $\phi V1$ to $\phi V7$. The reference symbol SH represents a shift gate. Symbols $\phi 1A$ and $\phi 2A$ represent first and second phase clocks, respectively. Symbol $\phi 2B$ represents a second phase final-stage clock. Symbol RG represents a reset gate. Symbol OD represents an output transistor drain. Symbol OS represents an output transistor source, and symbol IG represents an input gate. In this line sensor, a one-line output time $T_{exp}$ is equivalent to the sum of a vertical register driving time $T_V$ and a horizontal register driving time $T_H$, as shown in FIG. 8(b). The number of delay lines is controlled by the vertical register driving time $T_V$. FIG. 8(a) shows an example of a driving signal when the number of delay lines is set to "0".

In an image reading apparatus, generally, reduction or enlargement in a main scanning direction is performed by thinning or thickening signals in a video circuit, or by similar processing, and the reduction or enlargement in a sub-scanning direction is performed by increasing or decreasing the speed of movement in the sub-scanning direction.

In existing image reading apparatus, therefore, the speed of reading (the number of read lines per unit time) is fixed, and the resolution in the sub-scanning direction is changed by changing the speed of movement in the sub-scanning direction. That is, for example, if the resolution is 16 dot/mm when the reduction/magnification factor is 100%, the following relation is established:

| Reduction/enlargement factor % | Speed fold | Resolution dot/mm | Zigzag correction number of lines |
|---|---|---|---|
| 50 | 2 | 8 | 2 |
| 100 | 1 | 16 | 4 |
| 200 | ½ | 32 | 8 |
| 400 | ¼ | 64 | 16 |

Therefore, the resolution increases with the increase of the reduction/enlargement factor, and the number of line memories necessary for correcting the difference of, for example, 250 μm between the above-mentioned uniformly staggered arrays increases.

Accordingly, it becomes impossible to realize a required delay by only the above-mentioned built-in analog memory provided in a sensor, and it becomes necessary to also use an external memory. FIG. 9 shows an example of the assignment of the quantity of delay to a built-in memory and an external memory. When such an external memory is used in addition to the analog memory, an external memory 27 is connected to the output of an A/D converter 25 provided in a preceding sensor chip 21, and a control section 28 assigns the number of delay lines (corresponding to the establishment of the reduction/enlargement factor) to a built-in memory 23 and to the external memory 27. On the other hand, the number of delay lines for a built-in memory 24 provided in a succeeding sensor chip 22 is fixed at "0". Although the number of delay lines "0" is realized by controlling the line shift gates $\phi V1$ to $\phi V7$ by a driving signal shown in FIG. 8(a), when the number of delay lines is increased, timing for the line shift gates $\phi V2$ to $\phi V7$ (excluding the line shift gage $\phi V1$) is made earlier than the line shift gate $\phi V1$ by an amount of time corresponding to the number of delay lines. The diagrams (a) to (f) of FIG. 10 show the timing in the cases of the number of delay lines "1" to "6," respectively.

However, with the recent price decline for memory ICs, a system for performing more delay by an external memory has become advantageous. That is, although the increased capacity of an external memory causes costs to rise, such a memory may still be advantageous because it makes the complicated switching of the quantity of delay for a built-in line memory unnecessary. In order to use this advantage, as is shown in FIG. 9(b), a driving system is employed in which the number of delay lines for a built-in memory 23 provided in a preceding sensor chip 21 is fixed at a minimum of "2". In the case shown in FIG. 9(a), in order to set the reduction/enlargement factor between 50% and 400%, the quantity of delay selected from the number of delay lines "2" to "6" is assigned to the built-in memory 23, and that selected between the number of delay lines 0 to 10 is assigned to the external memory 27. In contrast, in the example shown in FIG. 9(b), the number of delay lines of the external memory 27 is changed to between "0" and "14." In the same manner, since a variable delay in a built-in memory is unnecessary when the quantity of delay is variable in an external memory, fixing the quantities of delay for built-in memories of preceding and succeeding sensor chips at the same value "0" further simplifies the circuit. This system is only a system for realizing the correction of the uniformly staggered array when a line sensor does not have built-in memory initially. That is, the above-mentioned use of an analog memory (Japanese Unexamined Patent Publication Nos. 60-31357 and 60-31358) is becoming less desirable with the lapse of time and changes in needs.

However, when a sensor including a built-in analog memory must be used, even though an analog memory is unnecessary, it is impossible to read the sensor unless this built-in analog memory portion is controlled. This control requirement, therefore, becomes an obstacle to using the sensor.

That is, when the analog memory has a fixed delay of "0," as described above, so that the quantity of delay is varied only in the external memory, a signal shown in FIG. 8(a) is input to the line shift gates $\phi V1$ to $\phi V7$ and the shift gate SH. When the width of each input pulse and each pulse interval is T, a time of 16 T is necessary for all pulses to occur. If the standard value of T is 2 μsec, a time of 32 μsec is necessary for all pulses to occur. As is shown in FIG. 8(b), it is necessary to stop the original charge coupled device (CCD) (also referred to as a horizontal register) while driving this vertical register. The driving of the two registers must be time-divided in such a manner because an inductive noise occurs if the horizontal register is driven to read an output while the vertical register is being driven. However, the larger the ratio of the vertical register driving time $T_V$ to the horizontal register driving time $T_H$, the more the reading efficiency deteriorates.

In an example shown in the diagrams (a) and (b) of FIG. 9, assuming that the video rate of a sensor is f (MHc), the one-line output time $T_{exp}$ expressed by:

$$T_{exp} = 3000 \times 1/f + 32 \text{ (μsec)}.$$

Therefore, in the case of 16 det/mm, the reading speed v (mm/sec) is expressed by the following equation expressing the relation between the reading speed v and the video rate f:

$$v = \frac{10_6}{T_{exp} \times 16}.$$

FIG. 4 shows the characteristic of the vertical register driving time $T_V = 32$ μsec that is obtained by plotting the result of the above-mentioned relation. FIG. 4 also shows the characteristic of the vertical register driving time $T_V = 4$ μsec that is similarly obtained by the result calculated in the case where no register is built in. Although it is unnecessary even in this case to drive the line shift gates $\phi V1$ to $\phi V7$, the vertical register driving time $T_V$ does not become zero, since driving of the shift gate SH is necessary.

As is shown in FIG. 4, when a sensor is driven with a high video rate (so as to read at a high speed of a little less than 200 mm/sec), the influence of the vertical register driving time $T_V$ cannot be ignored.

SUMMARY OF THE INVENTION

The present invention has been attained in view of the foregoing discussion, and an object thereof is to provide an original document reading apparatus that can read at high speeds due to a shortened vertical register driving time $T_V$.

Additional objects and advantages of the invention will be set forth in part in the description which follows and, in part, will be obvious from the description or may be learned by practice of the invention. The objects and advantages of the invention will be realized and attained by means of the elements and combinations particularly pointed out in the appended claims.

To achieve the objects and in accordance with the purpose of the invention, as embodied and broadly described herein, the invention comprises a plurality of line sensors arranged in a uniformly staggered array in a first scan direction, each of the plurality of line sensors including: a plurality of light receiving elements producing an image signal, and an analog image signal storing means for storing the image signal and for delaying output of the image signal according to a delay value, wherein each of the analog image signal storing means has a delay value equal to the others of the analog image storing means.

In an original document reading apparatus according to the present invention, the same delay value for one or more lines is set to respective output delay means built into the line sensors, so that the transfer time in a vertical register can be reduced corresponding to the delay value. In the case where no delay is set, a vertical register has to be transferred with respect to the respective stages, so that the transfer time in the vertical register for one-line output becomes long. Thus, it is possible to make the driving time in the output delay means shorter than the driving time where no delay is present and it is possible to read at a correspondingly high speed.

BRIEF DESCRIPTION OF THE DRAWINGS

An embodiment of present invention will be described with reference to the accompanying drawings.

DESCRIPTION OF A PREFERRED EMBODIMENT

Figure 1A:
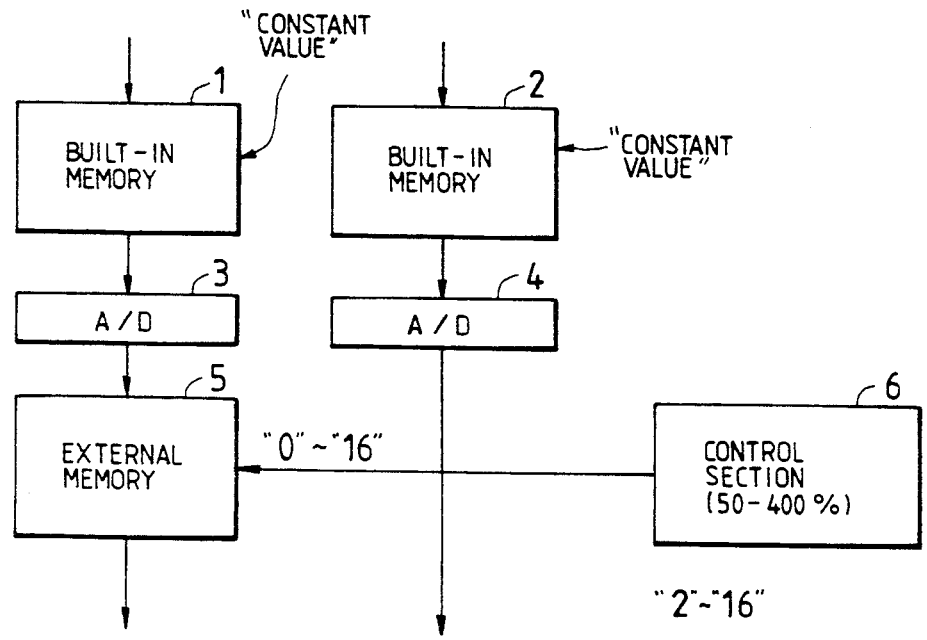
FIG. 1a and FIG. 1b are diagrams explaining an embodiment of the original document reading apparatus according the present invention.
Figure 1B:
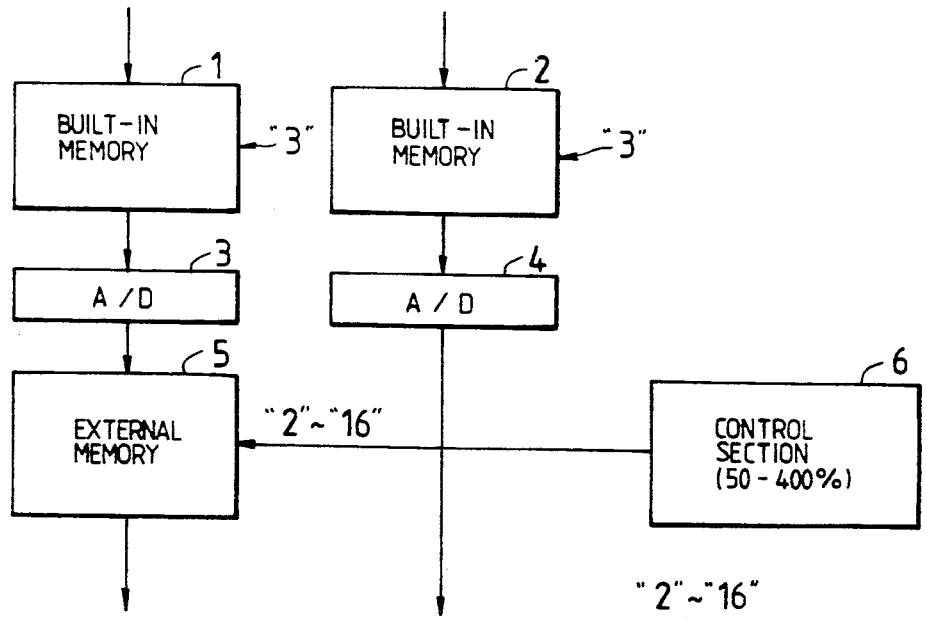
Figure 2A:
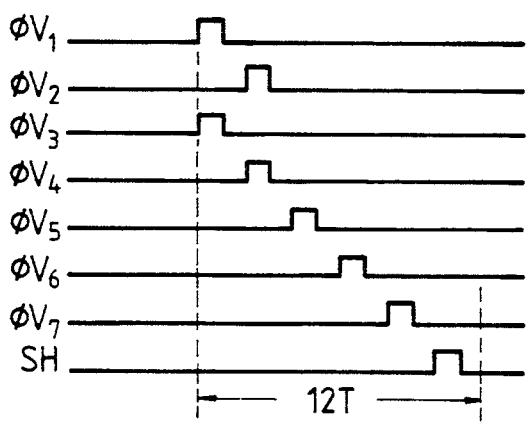
FIGS. 2(a-f) are diagrams illustrating an example of a driving signal for a vertical register.
Figure 2D:
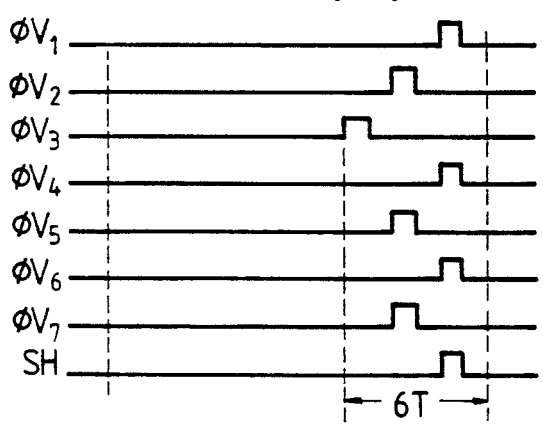
Figure 2B:
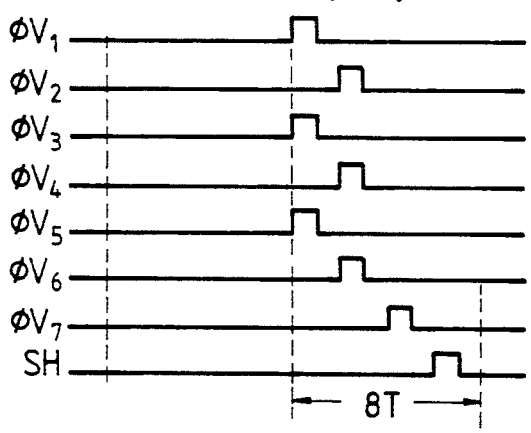
Figure 2E:
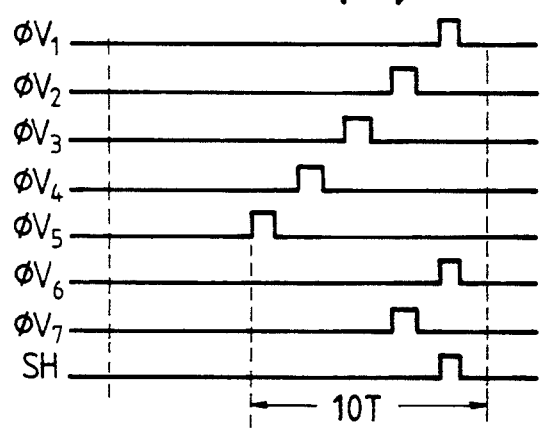
Figure 2C:
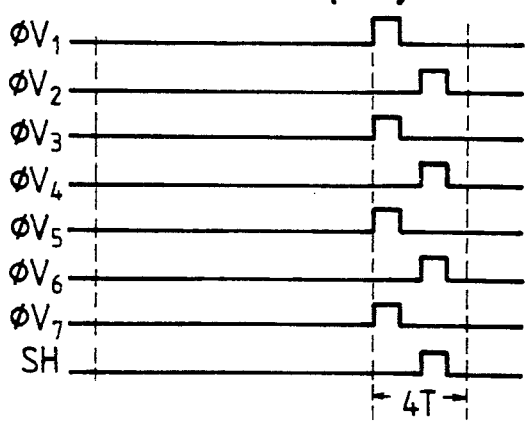
Figure 2F:
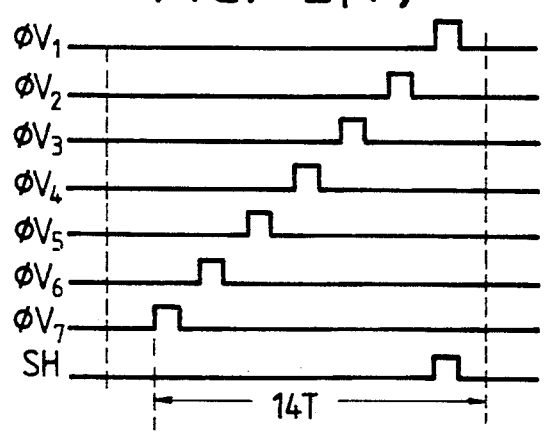

In FIGS. 1a and 1b a built-in memory 1 is arranged to control delay lines for a preceding sensor chip and a built-in memory 2 is arranged to control delay lines for a succeeding sensor chip. In an original document reading apparatus according to the present invention, these built-in memories 1 and 2 are set and fixed at a constant number of delay lines, the adjustment of relative delay lines between both the built-in memories is performed by an external memory 5. A control section 6 adjusts the number of delay lines for the external memory 5 corresponding to the reduction/enlargement factor. Thus, because the built-in memories 1 and 2 are set to a constant number of delay lines, it is possible to drive a plurality of line shift gates by the same pulse-train signal. Therefore, driving signals shown in the diagrams (a) to (f) of FIG. 2 can be used for the delays "1" through "6," respectively. In particular, when the number of delay lines of the built-in memory is fixed to "3," as shown in FIG. 1(b), two only kinds of pulse-train signals are needed to simultaneously drive the odd and even stages of a vertical shift register.

Figure 8A:
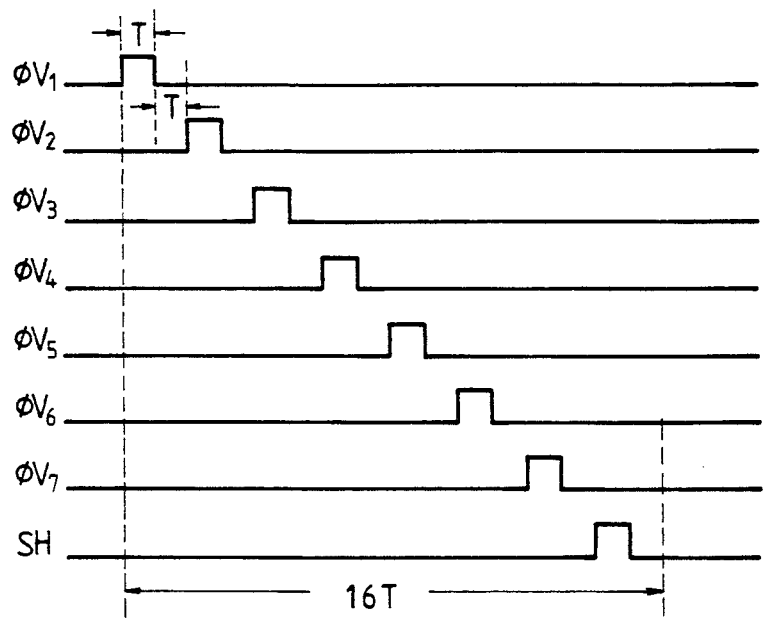
FIGS. 8a and 8b are diagrams illustrating an example of a driving signal for the analog memory of FIG. 7.

In a driving signal conventionally used for setting delay "0", because of transferring through a line shift gate during the time of one-line output, there is only one possible driving pattern signal, as shown in FIG. 8(a), and it is, therefore, impossible to shorten the vertical register driving time $T_V$ to less than 16 T.

Figure 3:
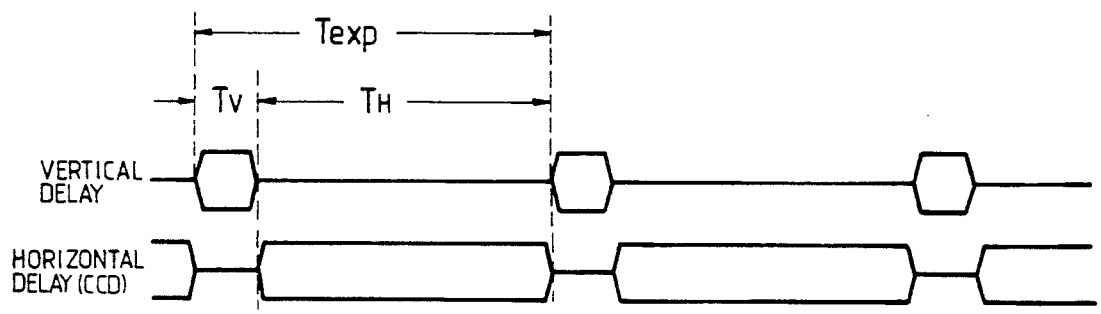
FIG. 3 is a diagram explaining the relation between the vertical register driving time and the horizontal register driving time during reading of one line.
Figure 4:
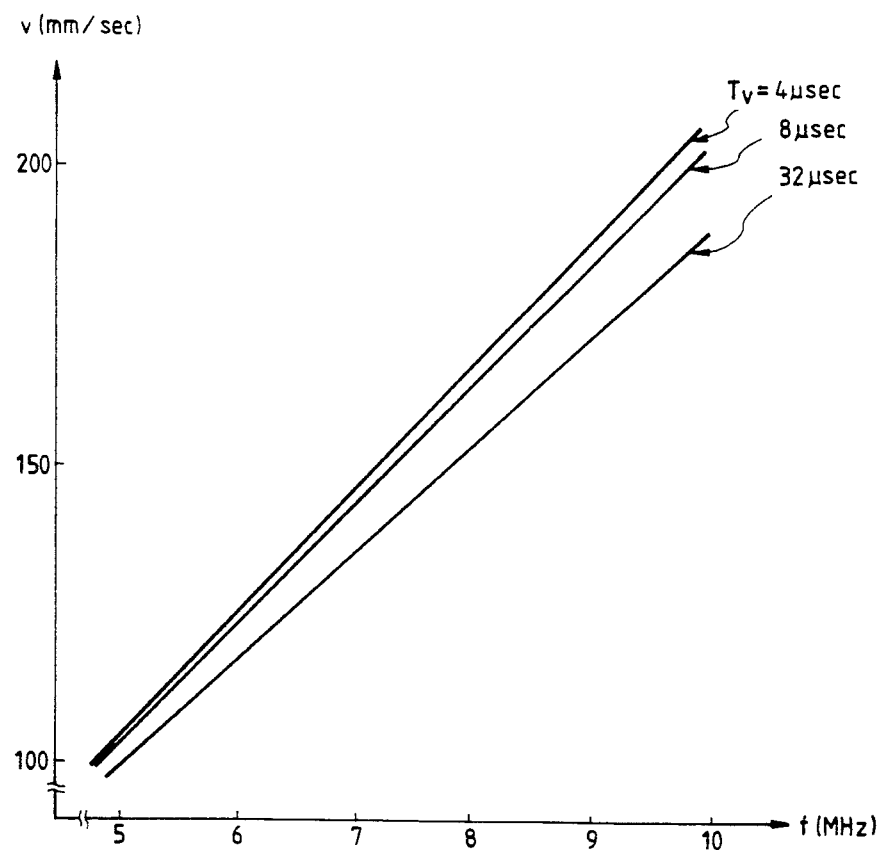
FIG. 4 is a diagram illustrating the relation between the video rate and the reading speed.
Figure 8B:
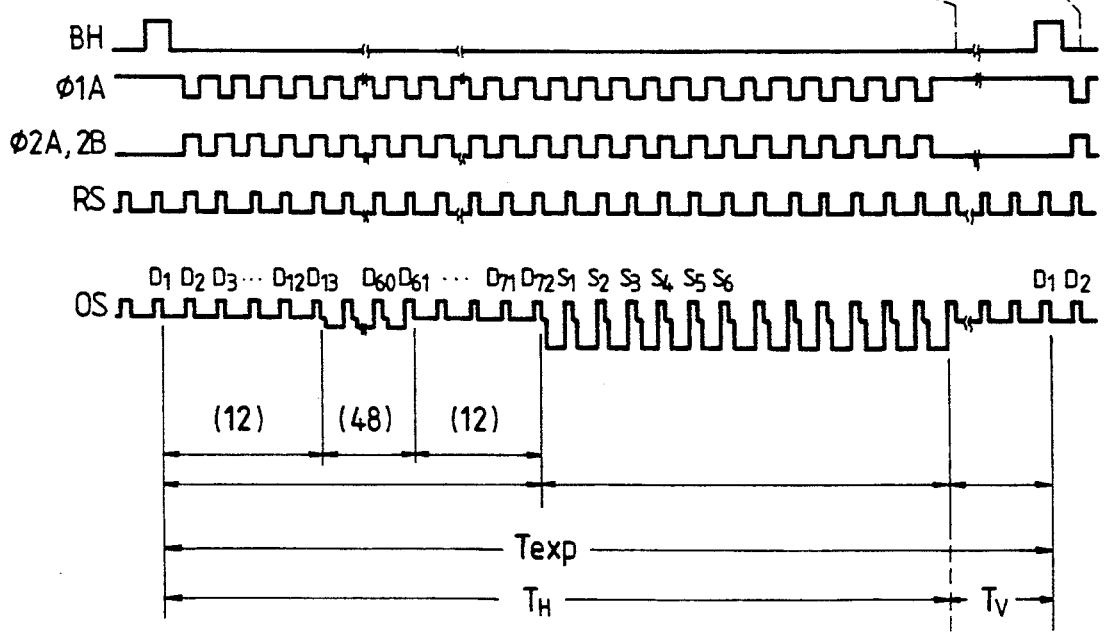
Figure 9A:
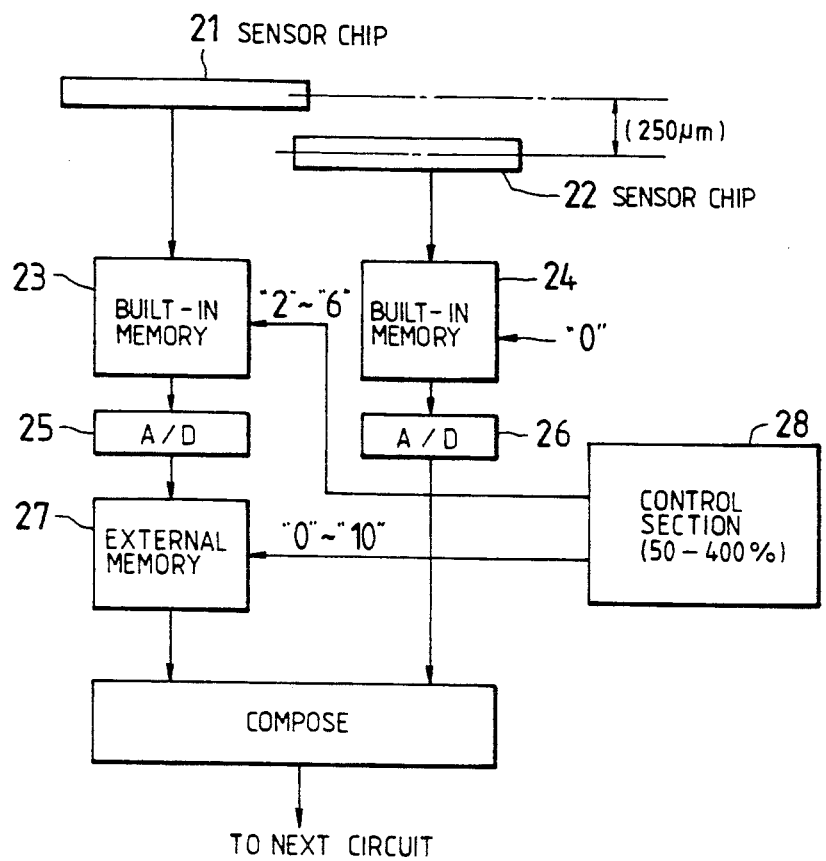
FIGS. 9a and 9b are diagrams explaining the control of a built-in memory and an external memory.
Figure 9B:
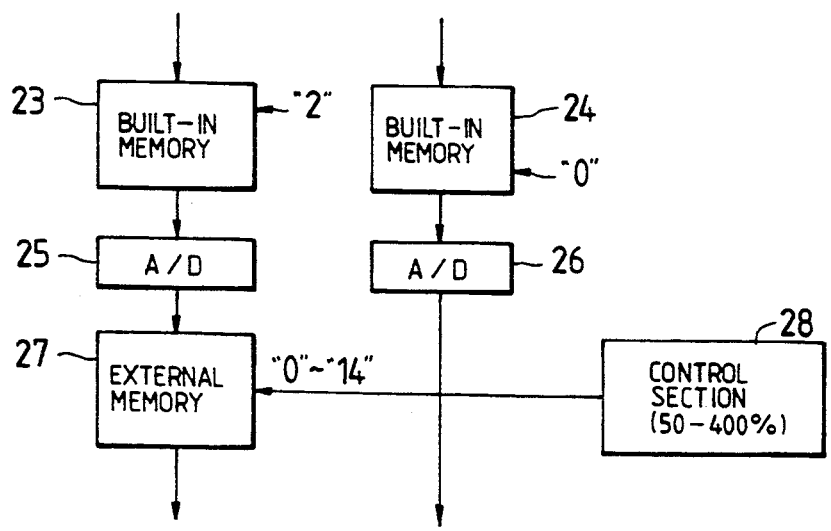
Figure 10A:
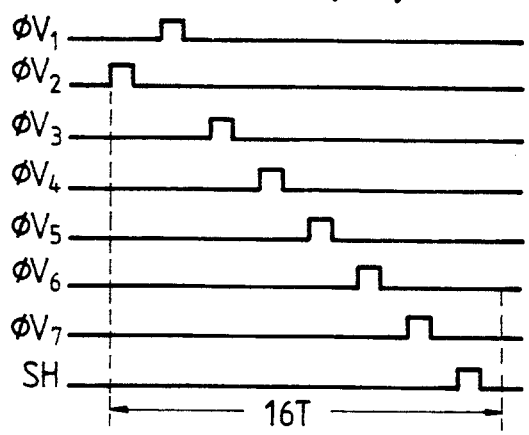
FIGS. 10(a-f) are diagrams illustrating examples of the pattern of a driving signal for the analog memory.
Figure 10D:
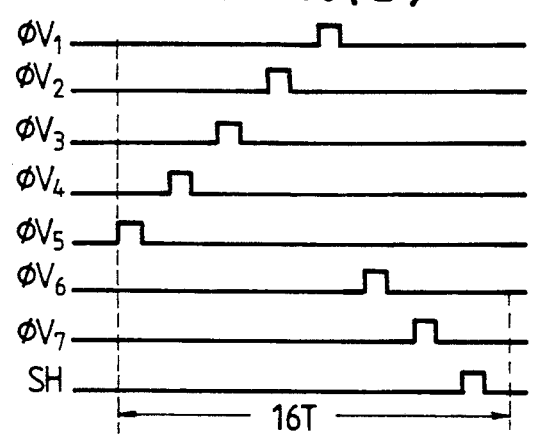
Figure 10B:
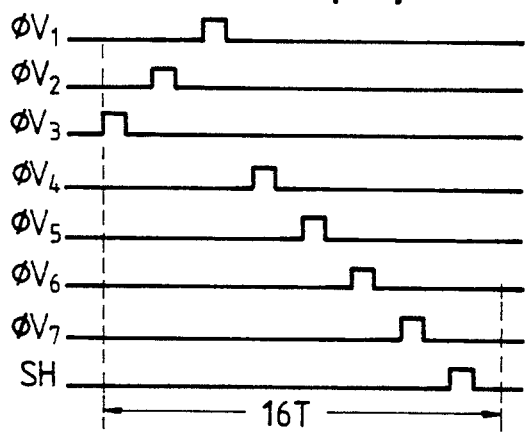
Figure 10E:
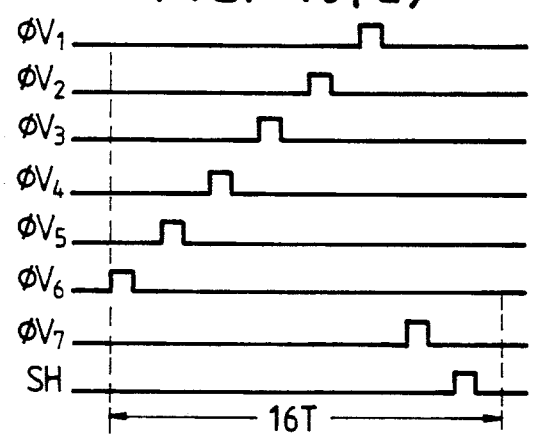
Figure 10C:
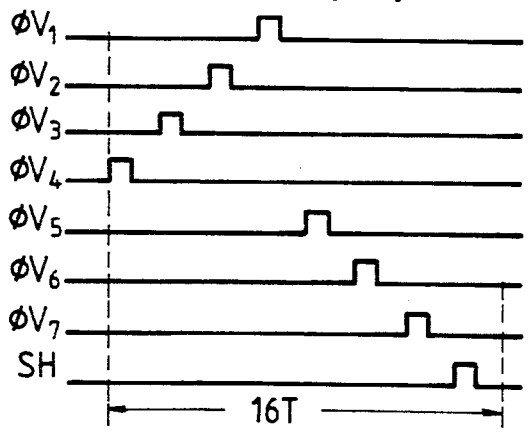
Figure 10F:
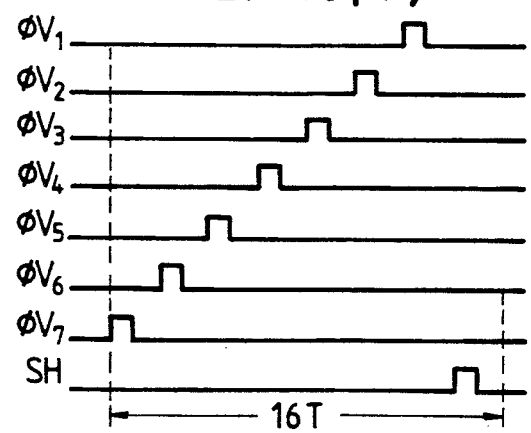

The one-line output time $T_{exp}$ is the sum of the vertical register driving time $T_V$ and the horizontal register driving time $T_H$, as shown in FIG. 3. Thus, the vertical register driving time $T_V$ must be shortened in order to increase the reading speed without increasing the video rate of a sensor. Therefore, if the number of delay lines is set to "1" or more, as shown in FIG. 2, there is a pattern that minimizes the vertical register driving time $T_V$ for any number of delay lines to make the vertical register driving time $T_V$ shorter than $T_V$ with no delay. For example, when the number of delay lines is "3", the vertical register driving time $T_V$ is only 4 T, so that the vertical register driving time $T_V$ is one-fourth as long as the time 16 T in the conventional case. The characteristic of the vertical register driving time $T_V = 8$ μsec of FIG. 4 shows the relation between the reading speed v and the video rate f at this time. Here, a comparison between the reading speed v and the video rate f with some specific numerical values, i.e., when no register is built-in ($T_V = 4$ μsec), when the number of delay lines is set to "3" according to the present invention ($T_V = 8$ μsec), and in the case of the conventional example described with respect to FIGS. 8 through 10 ($T_V = 32$ μsec), yields the following table:

| | Reading speed v (mm/sec) | | |
|---|---|---|---|
| | $T_v = 4$ | $T_v = 8$ | $T_v = 32$ |
| f = 5 | 103.5 | 102.8 | −98.9 |
| = 6 | 124.0 | 123.0 | 117.5 |
| = 7 | 144.5 | 143.2 | 135.7 |
| = 8 | 164.9 | 163.2 | 153.6 |
| = 9 | 185.3 | 183.1 | 171.1 |
| = 10 | 205.6 | 202.3 | 188.3 |

In the table, the video rate f is expressed in MHz and the driving time $T_V$ is expressed in μsec.

Thus, even in the case where uniformly staggered correction is not performed by using a built-in memory of a sensor, the above-mentioned vertical register driving time $T_V$ can be greatly shortened by causing all the sensor chips to perform the same delay of "1" or more lines, thereby shortening the reading time. The vertical register driving time $T_V$ is maximized when the number of delay lines is set to half (rounded up) of the maximum number of delay lines for the sensor. In this case, the line shift gate $\phi V1$ to $\phi V7$ and the shift gate SH can be realized by just two kinds of pulse-train signals different in timing from each other, thus simplifying the circuit.

Figure 6A:
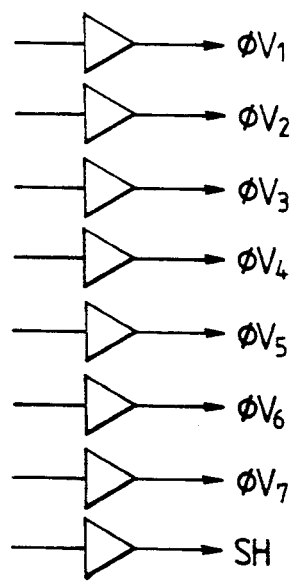
FIGS. 6a and 6b are diagrams illustrating a circuit arrangement of driving ICs in the best case according to the present invention in comparison to a conventional circuit.
Figure 6B:
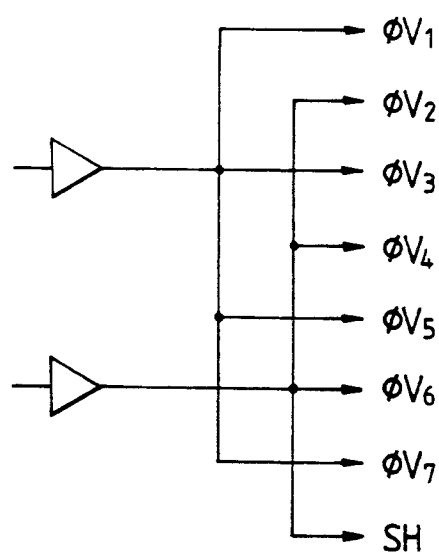
Figure 7:
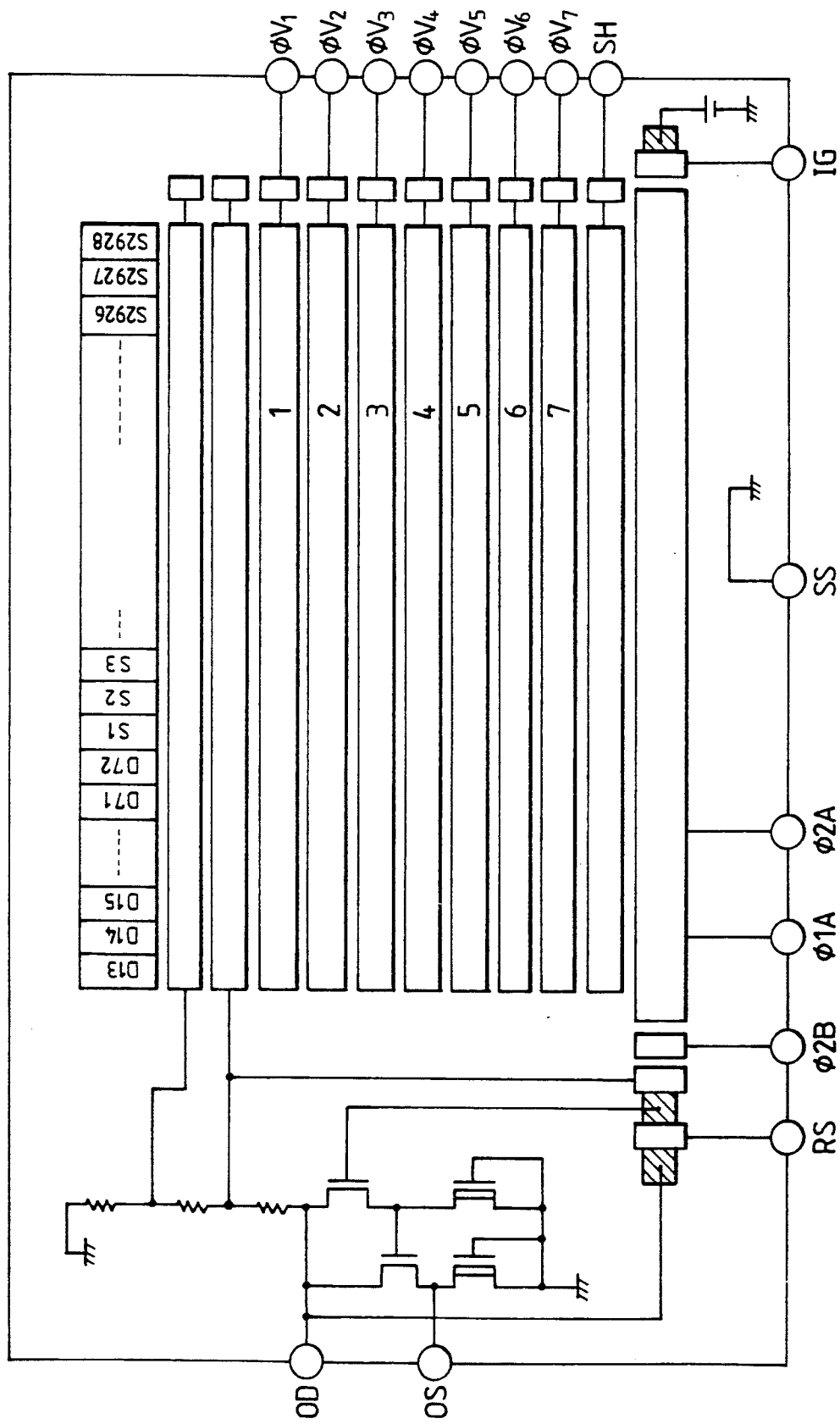
FIG. 7 is a diagram illustrating a circuit arrangement of a line sensor provided with an analog memory.

FIGS. 6a and 6b are diagrams illustrating a circuit arrangement of driving ICs in the best (shortest $T_V$) cases according to a conventional example and the present invention. The diagrams 6(a) and 6(b) show examples of settings of delay "3" according to the conventional example and the present invention, respectively.

Figure 5:
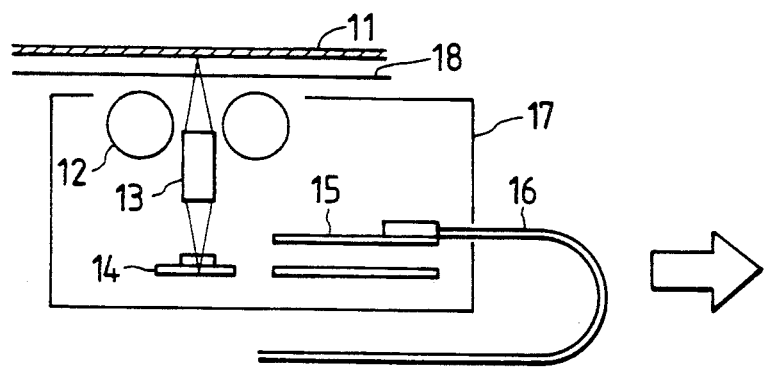
FIG. 5 is a diagram illustrating an arrangement of a unit of an image reading apparatus using a line sensor according to the present invention.

FIG. 5 is a diagram illustrating an example of the arrangement of a unit of an image reading apparatus using a line sensor according to the present invention. In FIG. 6, an original document 11 is set with its image surface to be read facing down. A scanning unit 17 moves on the lower surface of the original document in the direction of an arrow so as to expose the image surface with a light source 12 such as a fluorescent lamp, a halogen lamp, an LED (a light emitting diode), or the like. The reflected light from the original document 11 is focused on the light receiving surface of a close-contact sensor 14 by a rod lens array 13. The scanning unit 17 is thus provided with the light source 12, the rod lens array 13 and the close-contact sensor 14, and is further provided with a circuit substrate 15 including a built-in memory (analog), a delay quantity (fixed value) setting circuit, driving ICs, and so on. According to the present invention, the number of driving ICs in the circuit substrate 15 can be reduced so that it is possible to make the unit light in weight, small in size, and inexpensive. Particularly when the number of delay lines is set to "3", as is apparent from FIG. 2(c), two kinds of pulse-train signals different in timing from each other may be fed to the line shift gate $\phi V1$ to $\phi V7$ and the shift gate SH to thereby drive them, so that only two driving ICs are required to drive the line shift gates in the best, i.e., the shortest, case according to the present invention. In contrast, the conventional case requires eight driving ICs, as shown in FIG. 6(a). Accordingly, it is possible to reduce the required number of driving ICs by one-fourth.

As has been apparent from the above description, according to the present invention, even in the case of an original document reading apparatus in which line sensors including an analog memory as an output delay means are arranged in a uniformly staggered array, a constant quantity of delay is set to the built-in memories of both the preceding and succeeding line sensors, so that it is possible to make the driving time of a vertical register shorter than that in a conventional apparatus in which succeeding line sensors are set to the quantity of delay "0," thereby making it possible to improve the reading speed of the apparatus. Moreover, the number of driving ICs mounted on a scanning unit can be reduced, thereby making the scanning unit light in weight and low in heat generation. Further, since the number of connecting pins is reduced, it is possible to improve the efficiency of assembly and production, and to reduce the production costs.

Other embodiments will be apparent to those skilled in the art from consideration of the specification and practice of the invention disclosed herein. It is intended that the specification and examples be considered as exemplary only, with a true scope of the invention being indicated by the following claims.

What is claimed is:

1. An original document reading apparatus, comprising:
    a plurality of line sensors arranged in a uniformly staggered array in a scanning direction, each of said plurality of line sensors including:
    a plurality of light receiving elements producing an image signal;
    a plurality of analog image signal storing means for storing said image signal and for delaying output of said image signal according to a delay value;
    wherein each of said analog image signal storing means has a delay value equal to a delay value of at least one other of said analog image signal storing means;
    analog to digital converting means for converting said image signal from said analog image signal storing means to a digital signal; and
    external memory means for storing said digital signal received from said analog to digital converting means according to a variable delay value.

2. The original document reading apparatus of claim 1, wherein each said analog image signal storing means includes a first plurality of analog image signal storing means and a second plurality of analog image signal storing means,
    wherein the first plurality of analog image signal storing means are driven by a first pulse-train signal and the second plurality of analog image signal storing means are driven by a second pulse-train signal, and
    wherein said first and second pulse-train signals are different in timing from each other.

3. An original document reading apparatus including a plurality of line sensors arranged in a uniformly staggered array in a scanning direction, said apparatus comprising:
    a plurality of analog image signal storing means, one of said analog image storing means in each line sensor, for storing an image signal and for delaying output of said image signal according to a predetermined delay value responsive to one of only two kinds of pulse-train signals;
    control means for generating only two kinds of pulse-train signals to control said plurality of analog image signal storing means and for generating a variable delay signal;
    a plurality of analog-to-digital converters, each for converting the output of one of said plurality of analog image storing means to a digital signal; and
    external memory means for receiving and storing, according to said variable delay signal, said digital signal received from each analog-to-digital converter.

* * * * *